(12) United States Patent
Hager et al.

(10) Patent No.: US 6,885,334 B1
(45) Date of Patent: Apr. 26, 2005

(54) METHODS AND SYSTEMS FOR DETECTING FORWARD OBSTACLES

(75) Inventors: James R. Hager, Golden Valley, MN (US); Larry D. Almsted, Bloomington, MN (US); Robert C. Becker, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/885,860

(22) Filed: Jul. 7, 2004

Related U.S. Application Data

(60) Provisional application No. 60/560,292, filed on Apr. 6, 2004.

(51) Int. Cl.[7] .............................................. G01S 13/00
(52) U.S. Cl. .............................. 342/62; 342/63; 342/65; 342/120; 342/121
(58) Field of Search ..................... 342/62–65, 120–122, 342/195

(56) References Cited

U.S. PATENT DOCUMENTS

| | | | |
|---|---|---|---|
| 5,381,338 A | * | 1/1995 | Wysocki et al. ............ 701/207 |
| 5,828,332 A | | 10/1998 | Frederick |
| 6,389,354 B1 | | 5/2002 | Hicks et al. |
| 6,538,581 B2 | | 3/2003 | Cowie |
| 6,750,807 B1 | | 6/2004 | Hager et al. |
| 6,803,878 B2 | * | 10/2004 | Hager et al. ................. 342/173 |
| 2003/0210180 A1 | * | 11/2003 | Hager et al. ................. 342/165 |

OTHER PUBLICATIONS

"Fusing interferometric radar and laser altimeter data to estimate surface topography and vegetation heights", Slatton, K.C.; Crawford, M.M.; Evans, B.L.;Geoscience and Remote Sensing, IEEE Trans on, vol.: 39, Issue: 11, Nov. 2001 Ps:2470–2482.*

* cited by examiner

*Primary Examiner*—John B. Sotomayor
(74) *Attorney, Agent, or Firm*—Matthew Luxton, Esq.; Armstrong Teasdale LLP

(57) ABSTRACT

Methods and apparatus for detecting obstacles in the flight path of an air vehicle are described. The air vehicle utilizes a radar altimeter incorporating a forward looking antenna and an electronic digital elevation map to provide precision terrain aided navigation. The method comprises determining a position of the air vehicle on the digital elevation map, selecting an area of the digital elevation map in the flight path of the air vehicle, based at least in part on the determined air vehicle position, and scanning the terrain representing the selected map area with the forward looking antenna. The method also comprises combining the digital elevation map data for the selected map area with radar return data for the scanned, selected area and displaying the combined data to provide a representation of the terrain and obstacles in the forward flight path of the air vehicle.

23 Claims, 5 Drawing Sheets

METHODS AND SYSTEMS FOR DETECTING FORWARD OBSTACLES

CROSS REFERENCE TO RELATED APPLICATIONS

This application claims priority of Provisional Application Ser. No. 60/560,292 filed Apr. 6, 2004.

BACKGROUND OF THE INVENTION

This invention relates generally to radar altimeters, and more specifically to a radar altimeter with a forward looking capability.

The proper navigation of an aircraft in all phases of its flight is based, to a large extent, upon the ability to determine the terrain over which it is passing, and further based on the ability to determine a position of the aircraft. In this regard, aircraft instrumentation, sensors, radar systems, and specifically, radar altimeters are used in combination with electronic terrain maps. The electronic terrain maps (sometimes referred to as digital elevation maps or DEMs) provide the height (elevation) of objects on the map, and together with the radar altimeter, aid in the flight and the planning of a flight path for the aircraft.

As such, radar altimeters are commonly implemented within aircraft. A radar altimeter typically includes a transmitter for applying pulses of electromagnetic energy at regular intervals to an antenna which then radiates the energy, in the form of a transmit beam, towards the earth's surface. A transmit beam from a radar is sometimes said to "illuminate" an area which reflects the transmit beam.

The radar altimeter further includes a signal receiver which receives return pulses, sometimes referred to as an echo or a return signal. Return pulses are received at an receive antenna, and constitute transmit beams that have been reflected from the earth's surface. It is known that some radar altimeters utilize the same antenna for both transmitting and receiving. A closed loop servo tracker for measuring a time interval between the transmitted pulse and its associated return pulse also forms a part of the radar altimeter. The time interval between the transmit pulse and the return pulse is directly related to the altitude of the aircraft.

However, problems still exist with flights into certain terrain. For example, aircraft, especially helicopters, are sometimes required to fly at very low altitudes. Flying at such low altitudes increases the probability that certain terrain features are in front of the aircraft, in the flight path, rather than safely below the aircraft, as is the case at normal flight altitudes.

Radar altimeters are generally incapable of detecting objects that are in a flight path. Examples of such objects include, for example, tall buildings, or the side of a cliff. While an aircraft equipped with a radar altimeter can determine an altitude, the aircraft is not able to determine the presence of objects in front of the aircraft if not equipped with, for example, a costly scanning laser radar. Problems also exist even when the scanning laser radar is implemented within an aircraft since they are sometimes rendered ineffective when encountering one or more of rain, fog, and smoke.

As described above, certain helicopter missions are flown at a very low altitude, for example, 20 to 100 feet. Such nap of the earth flights (e.g., low level contoured flights over the earth surface), may include flying around certain obstacles, to maintain as low a profile as possible in order to minimize detection by enemy forces. Medical emergency response missions also often require low altitude operations. Electronic digital elevation maps (DEMs) have been integrated with navigation systems, for example, radar altimeters and inertial measurement units, to provide a look ahead capability, based on the data in the DEM, that allows a pilot to see ahead through the weather, on a heads up or cockpit display. Such integrated systems therefore provide a display of obstacles recorded within the DEM based on a position as determined by the navigation systems. However, DEM data can be inaccurate, for example, due to an addition of new manmade structures after the DEM data was collected. These possible DEM inaccuracies have resulted in a lack of confidence to safely fly at the desired low altitudes during low visibility conditions.

BRIEF SUMMARY OF THE INVENTION

In one aspect, a method for detecting obstacles in the forward flight path of an air vehicle is provided. The air vehicle utilizes a radar altimeter and an electronic digital elevation map for precision terrain aided navigation, and the radar altimeter incorporates a forward looking antenna. The method comprises determining a position of the air vehicle on the digital elevation map, selecting an area of the digital elevation map in the flight path of the air vehicle, based at least in part on the determined air vehicle position, and scanning the terrain representing the selected map area with the forward looking antenna. The method also comprises combining the digital elevation map data for the selected area with radar return data for the scanned, selected area and displaying the combined data to provide a representation of the terrain and obstacles in the forward flight path of the air vehicle.

In another aspect, a radar altimeter is provided. The radar altimeter comprises a precision terrain aided navigation (PTAN) processor configured to process interferometric radar altimeter data, a terrain correlation processor configured to correlate data from the PTAN processor to a present vehicle location on a digital elevation map (DEM), and a forward map scanning processor configured to receive an altitude from the PTAN processor and determine a position on the DEM to scan which is forward of the vehicle. The radar altimeter further comprises a forward looking processor configured to receive data relating to a scan of the terrain corresponding to the position on the DEM that the forward map scanning processor is configured to scan, and a display processor configured to process and reconcile data from the forward map scanning processor and the forward looking processor.

In still another aspect, a processing unit for a radar altimeter configured to provide an altimeter function and a forward looking obstacle avoidance function is provided. The processing unit is configured to receive and process interferometric radar altimeter data, correlate processed interferometric radar altimeter data to a present vehicle location on a digital elevation map (DEM), and determine a terrain position to scan which is forward of the vehicle based at least in part on a position generated from the correlated interferometric radar altimeter data. The processing unit is further configured to receive data relating to a scan of the terrain corresponding to the correlated interferometric radar altimeter data and combine the data relating to the scan of the terrain with data from the DEM.

DETAILED DESCRIPTION OF THE INVENTION

A radar altimeter which provides a forward looking capability is herein described. Precision terrain aided navigation (PTAN) allows correlation of radar ground return data with a digital elevation map (DEM), resulting in a position update to a navigation system. Such navigation systems typically will incorporate at least two sources of navigation information in providing a position solution. For example, an inertial navigation unit, for example, along with a radar altimeter incorporating PTAN capability, will provide a navigation solution. In such a scenario, position updates based on radar are used to subtract out drift errors generated by an inertial sensor of the inertial navigation unit, resulting in highly accurate navigation position capability. The success of poor visibility, low flying missions depends not only on a system like a radar altimeter with PTAN capability to provide an exact vehicle location on the DEM, but also the ability to determine the existence of obstacles in front of the aircraft not shown on the DEM.

Figure 1:
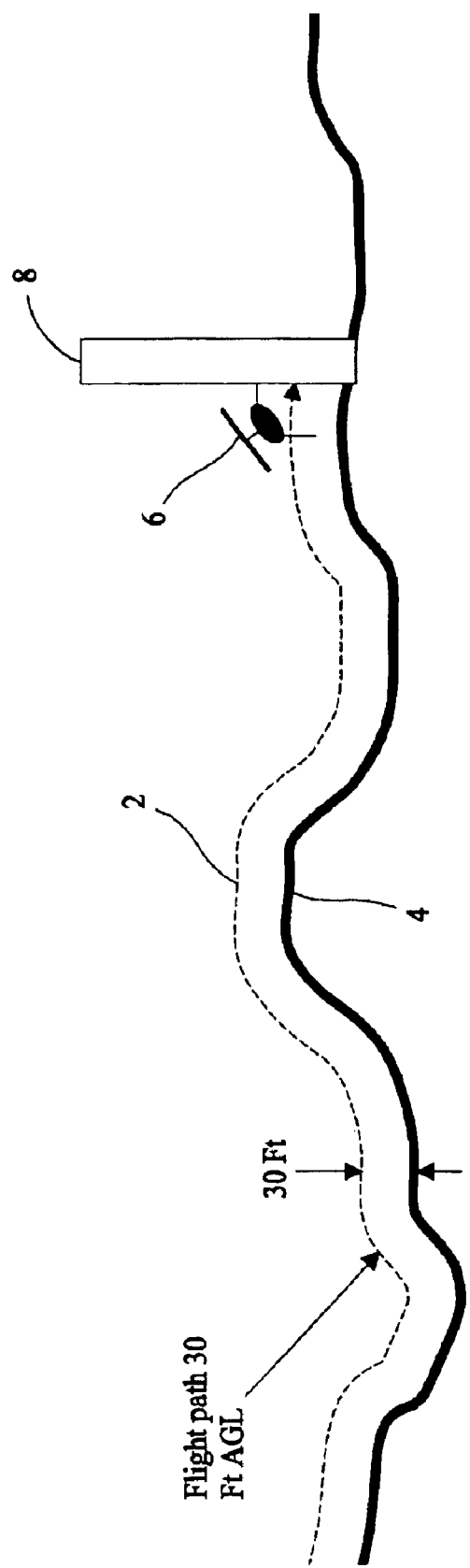
FIG. 1 is an elevation view of a nap of the earth flight path over a terrain.

FIG. 1 is an elevation view of a nap of the earth flight path over terrain (a nap of the earth flight is a low level contoured flight over the earth surface). As illustrated, flight path 2 is thirty feet above ground level (AGL) 4. By following flight path 2, helicopter 6 is on a collision course with a man made obstacle 8. A present location of helicopter 6 on a DEM is provided by a PTAN radar system mounted in helicopter 6. In the example illustrated by FIG. 1, obstacle 8 is not including in the DEM data, and represents a critical hazard to helicopter 6 during poor visibility conditions. The systems and methods described herein provide an ability to detect unmapped obstacles similar to obstacle 8. Further, the described systems and methods, provide a safe path for navigating around such unmapped obstacles, by adding a forward looking narrow beam-scanning antenna (not shown in FIG. 1) to the PTAN radar system.

In one embodiment, the radar altimeter provides a down looking altitude function, as is known in the art, based on transmissions from and reflections received at one or more radar altimeter antennas. The altimeter also provides a forward terrain or obstacle warning function, based on transmissions from and reflections received at a forward looking antenna.

Figure 2:
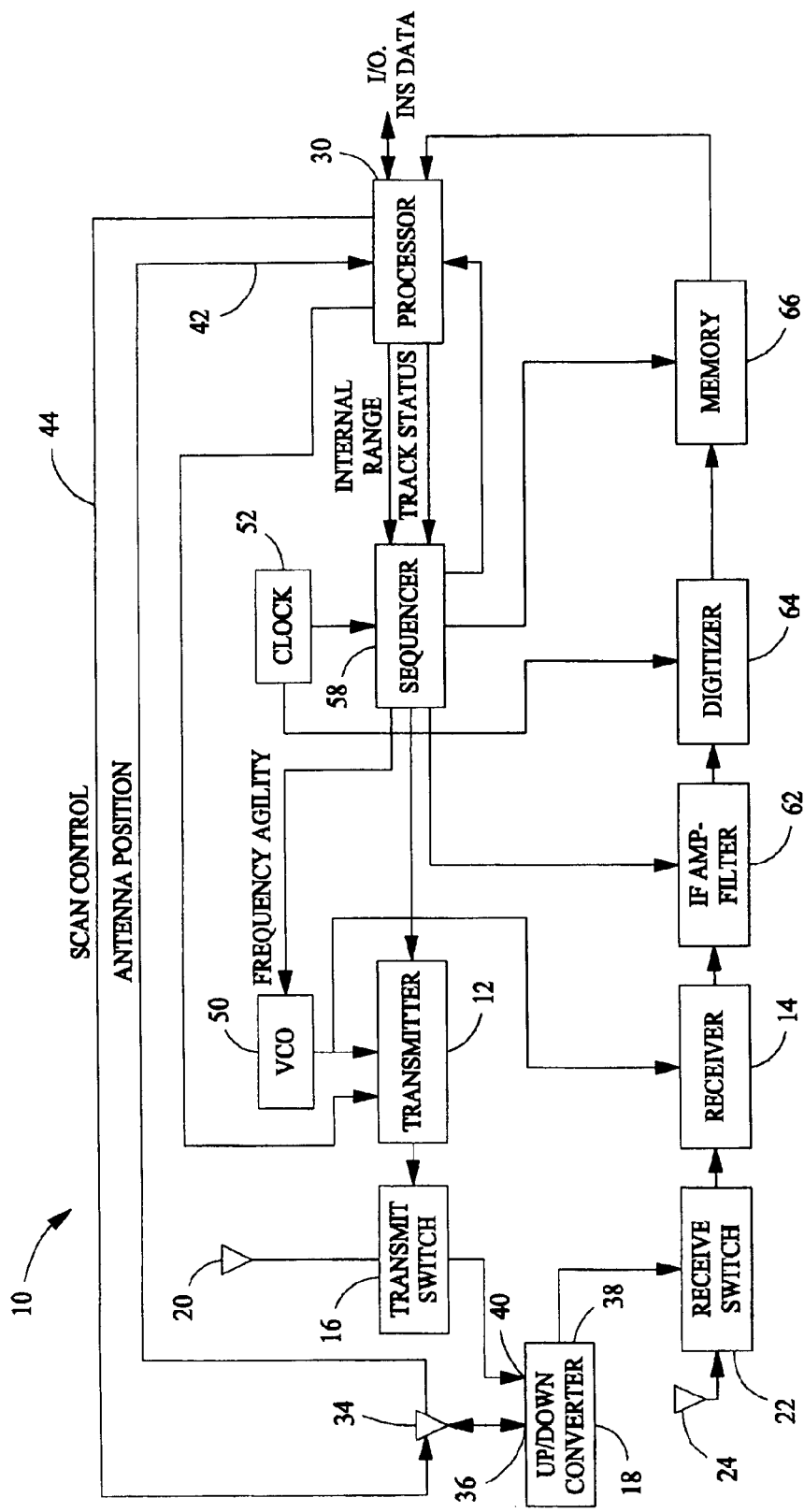
FIG. 2 is a block diagram of a radar altimeter incorporating a forward looking antenna.

FIG. 2 is a block diagram illustrating one embodiment of a radar altimeter 10 which incorporates the above described forward looking capabilities. Radar altimeter 10 includes a transmitter 12 and a receiver 14. In one embodiment, an output of transmitter 12 is routed through a transmit switch 16 to one of a up/down converter 18 or a transmit antenna 20, which transmits pulses towards the ground as part of an altimeter function. Receiver 14 receives its inputs from a receiver switch 22 which switches between up/down converter 18 and a receive antenna 24 that receives radar pulses reflected from the ground that originated from transmit antenna 20 as another part of the radar altimeter function. To provide the PTAN capability, receive antenna 24 and receiver switch 22 are representative of a multiple receive antenna system which provides highly accurate altitude measurements.

Transmitter 12 further receives pulse modulation and phase modulation data originating from radar processor 30. Receiver 14 forwards radar return data received at antenna 24 to radar processor 30. Radar processor 30 determines an altitude of the vehicle in which it is installed, and forwards the altitude data directly or indirectly to displays and other functions which utilize altitude data within an avionics system of an air vehicle.

As described above, radar altimeter 10 includes an up/down converter 18 which is coupled to both transmitter 12 and receiver 14 through the respective transmit and receiver switches 16 and 22. Up/down converter 18 is also coupled to a forward looking antenna 34. Up/down converter 18 functions to convert a normal altimeter frequency, for example, 4.3 GHz, up to a higher frequency, for example, 35 GHz, for transmission from forward antenna 34. Up/down converter 18 is also utilized to down convert the 35 GHz forward radar return, received at forward looking antenna 34, down to 4.3 GHz for processing by receiver 14 of radar altimeter 10. Up/down converter 18 includes a circulator which functions to circulate energy originating at its antenna port 36 through its down conversion channel to its receive port 38, and energy originating at its transmit port 40 to antenna port 36 allowing a single antenna (e.g., antenna 34) to both transmit and receive. Radar processor 30, receives data from an inertial navigation system (INS) within the vehicle which provides data relating to, for example, vehicle attitude and velocity. Further, radar processor 30 receives an antenna position 42 from forward looking antenna 34 which is utilized as feedback in a closed loop scan control servo 44 for movement of antenna 34 as further described below.

While example frequencies of 4.3 Ghz for radar altimeter operation, and 35 Ghz for the forward looking radar function, are described herein, it is to be understood that such frequencies are examples only, and that other operating frequencies are contemplated. The example 4.3 GHz radar altimeter operating frequency allows for a large transmit beam, for example, 40 degrees. The radar altimeter frequency of 4.3 Ghz is up converted to 35 Ghz for the forward looking radar function to allow generation of a narrow beam, on the order of a couple of degrees. Antenna size related to a particular frequency increases as beam width is decreased. Therefore, up converting to a frequency on the order of 35 GHz, for example, allows for a forward looking antenna (antenna 34 in FIG. 1 and antenna 144 in FIG. 4) of reasonable size while still providing a two or three degree beam width for the forward looking function.

In operation, radar altimeter 10 combines the transmit, receive, and their associated signal processing functions of known radar altimeters with forward looking antenna 34 through up/down converter 18 to provide a forward obstacle avoidance function. In one embodiment, forward looking antenna 34 and up/down converter 18 provides, at least in part, a 40 degree in azimuth by 20 degree in elevation field of view by having its transmit beam moved in a raster scanning motion (further described with respect to FIG. 3). The raster scanning motion is controlled via the above described antenna position functionality provided through radar processor 30 and switching between the forward obstacle avoidance function and radar altimeter function through transmit switch 16 and receiver switch 22. Further control of the forward obstacle avoidance function is provided by the scan control functionality also via radar processor 30.

Radar altimeter 10 further includes a voltage controlled oscillator (VCO) 50, a clock 52, sequencer 58, an intermediate frequency (IF) amplifier-filter 62, digitizer 64, and memory 66.

Transmitter 12 transmits pulses of RF energy, via transmit switch 16, towards the ground through antenna 20. The RF energy is modulated, in one embodiment, with a pulse compression bi-phase coded format produced by sequencer 58 resulting in: modulated radar signals. The output power of transmitter 12 is controlled in a closed loop fashion by processor 30. The output power of transmitter 12 is minimized by processor 30 for a low probability of detection.

Antenna 24 receives the modulated radar signals reflected from the ground. The received signals are routed through receiver switch 22, amplified and mixed down to an IF by receiver 14, and further amplified and band limited by IF amplifier-filter 62. Digitizer 64 digitizes the received signal, and outputs the digitized samples to memory 66.

Sequencer 58 selects ground return samples corresponding to a present altitude delay (as determined by processor 30) and communicated to sequencer 58 on an internal range line) and shifts the selected samples from memory 66 to processor 30. Processor 30 then determines if the next set of samples should be taken closer in or further out in range, and generates a new internal range command. The result is a closed-loop altitude tracking servo, such that as the altitude changes, processor 30 generates a measure of range tracking error which is used to change the internal range command fed back to sequencer 58. Processor 30 generates an output altitude from the internal range.

Circulator 18 is coupled to transmitter 12 through transmit switch 16 and to receiver 14 through receiver switch 22. Operation of forward looking antenna 34 is controlled through antenna positioning data 42 and scan control functions 44, for example, through couplings to processor 30. Transmissions transmitted by forward looking antenna 34 may reflected by an object and subsequently received by forward looking antenna 34. Circulator 18 takes the RF energy received at forward looking antenna 34 and outputs the energy to receiver 14 through receiver switch 22.

In another embodiment of a radar altimeter (not shown) that incorporates a forward looking antenna, a circulator (not shown) is utilized so that a single antenna can be utilized for both the radar altimeter transmit and receive functions. In the embodiment, the circulator receives outputs from transmitter 12 (through transmitter switch 16) and provides that signal to the single antenna for transmission of radar pulses. The circulator also receives the reflected pulse received at the single antenna, and directs those signals to receiver 12 (through receiver switch 22). Therefore, the circulator is coupled to both transmitter 12 and receiver 14 and further configured to alternate the single antenna between transmit and receive modes.

Figure 3:
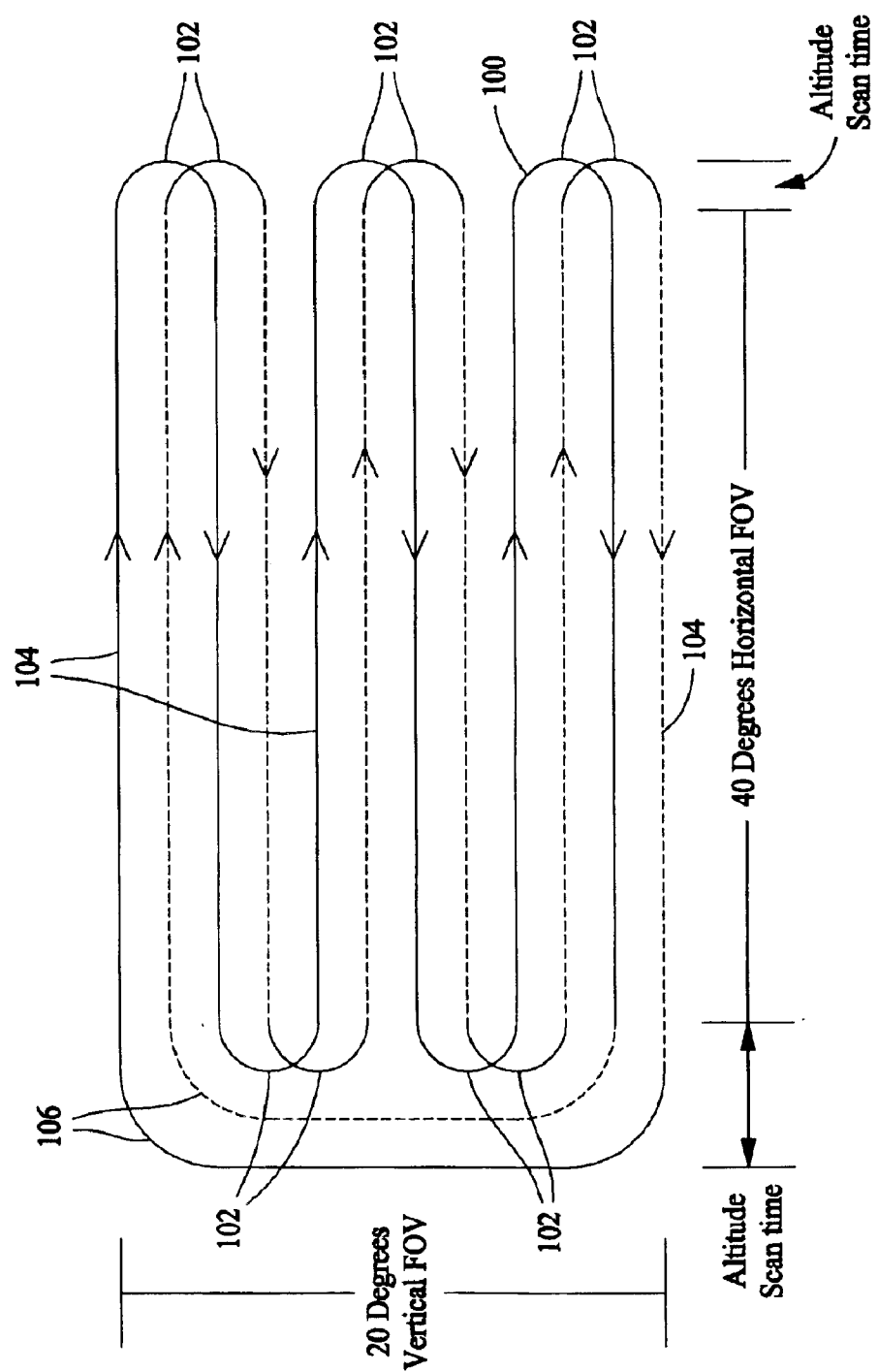
FIG. 3 is an illustration of one possible scanning pattern for a forward looking antenna

FIG. 3 is an illustration of one possible embodiment of a scanning pattern for forward looking antenna 34 (shown in FIG. 2). In the embodiment shown, forward looking antenna 34 provides a ±10 degree (in elevation) by ±20 degree (in azimuth) field of view by moving its transmit beam 100 in a raster scanning motion. At ends 102 of the horizontal scans 104, and during a fly back portion 106 of the scan, collectively referred to as turnaround portion of the scan, the forward looking function within radar altimeter 10 is turned off, by radar processor 30, for example, and the altimeter function is activated. Once the altimeter function is completed, and forward looking antenna 34 is again scanning horizontally, radar altimeter processing is halted, and the above described forward looking function is again activated.

Figure 4:
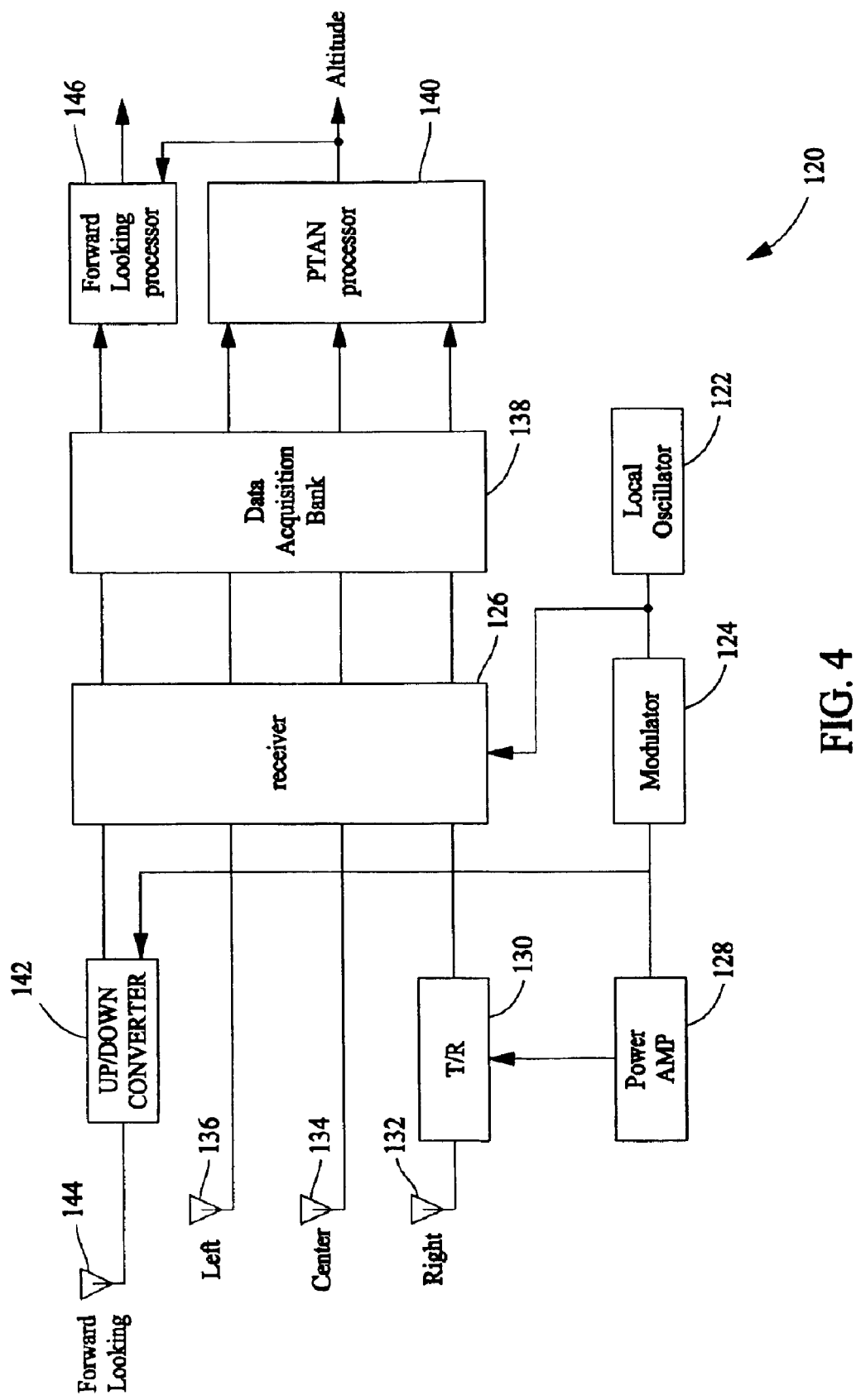
FIG. 4 is a block diagram illustrating a multiple receive antenna system included a forward looking antenna incorporated into a radar altimeter.

PTAN capability is at least in part provided by a multiple receive antenna system which provides highly accurate altitude measurements. FIG. 4 is a block diagram illustrating one embodiment of such a multiple receive antenna system 120 that can be incorporated into radar altimeter 10 (shown in FIG. 2). For transmission of radar pulses, a local oscillator 122 (similar to VCO 50 shown in FIG. 2) provides a signal to a modulator 124 and a receiver 126. The modulated signal is output from modulator 124 to a power amplifier 128 and on to a transmit/receive switch 130 for transmission from right antenna 132 as part of the radar altimeter function. Signals transmitted from right antenna 132 are reflected off the earth's surface and received, at slightly different times at right antenna 132, center antenna 134, and left antenna 136, resulting in phase differences between the received signals due to the cross track spacing of the antennas. Antennas 132, 134, and 136 provide the received signals to receiver 124 which forwards the received signals to data acquisition bank 138 (which is representative of IF amplifier-filter 62, digitizer 64, and memory 66 (all shown in FIG. 2)) for sampling. PTAN processor 140 provides the Doppler filtering to limit the ground illumination area to a very narrow cross track swath within the antenna illuminated area, at a known filter center frequency or resulting angular position with respect to the line of flight of the aircraft. PTAN processor further provides for tracking of the nearest return, generally the highest point in elevation on the ground, and utilizes the phase relation between the tracked radar return signals of the three channels to determine a cross track angle to the nearest (highest in elevation) position within the illuminated swath. The measured radar delay to this tracked target provides a slant range to the target. Horizontal and vertical position of this highest point is then calculated from the measured slant range, cross track angle, and angle to the Doppler swath.

Modulator 124 also provides a 4.3 GHz modulated signal to 35 GHz up/down converter 142 for up conversion and transmission of 35 GHz radar pulses forward of the vehicle from forward looking antenna 144. Radar pulses are transmitted forward of the vehicle, as described herein, reflected off any obstacles forward of the vehicle, and are received at forward looking antenna 144. These received signals are routed through up/down converter 142, where the received return is down converted to 4.3 GHz, and routed to receiver 126. From receiver 126 the signals are sampled at data acquisition bank 138 and the samples are sent to forward looking processor 146 for processing as described below. PTAN processor 140, forward looking processor 146, and other processors described below, in one embodiment, are processing functions incorporated within processor 30 of radar altimeter 10 (shown in FIG. 1).

Figure 5:
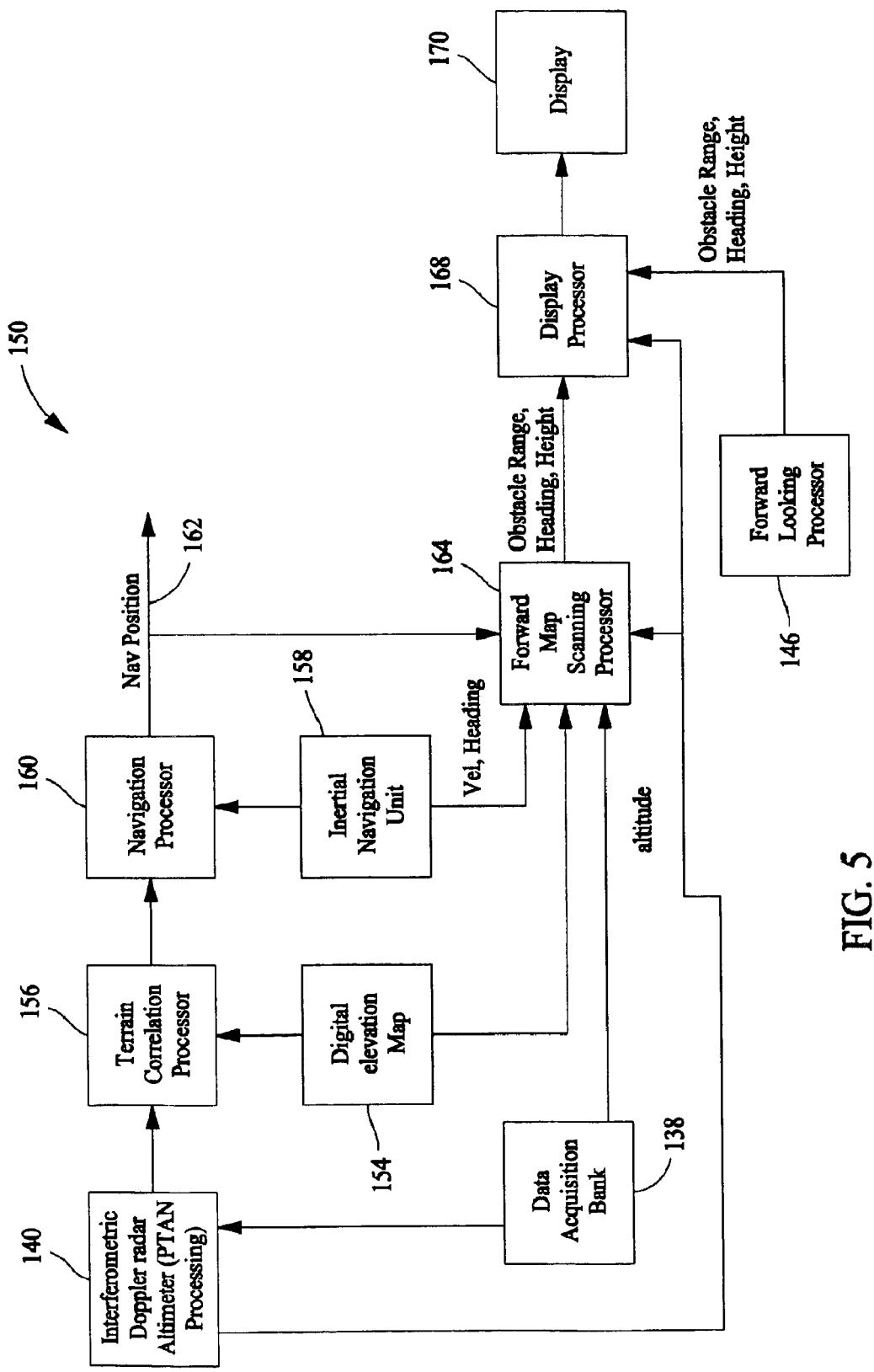
FIG. 5 is a block diagram illustrating utilization of data from a PTAN processor and a forward looking processor.

FIG. 5 is a block diagram 150 illustrating utilization of data from PTAN processor 140 and forward looking processor 146 (both also shown in FIG. 4) to provide warning of forward obstacles in a flight path of a vehicle. PTAN capabilities are provided, at least in part, by PTAN processor 140 processing interferometric Doppler radar altimeter data received from data acquisition bank 138, DEM 154, terrain correlation processor 156, inertial navigation unit 158, and navigation processor 160. In operation, a radar altimeter (e.g. radar altimeter 10 shown in FIG. 2) transmits (and receives for eventual processing at PTAN processor 140), a Doppler swath towards the ground. An area on the ground which is processed by the PTAN processing function 140 is bounded by the antenna beam and further bounded by a narrow bandpass Doppler filter (within processing function 140) providing a narrow in down track, and wide in cross track Doppler swath. The resulting return from this bounded area is further processed with a closed loop tracker, with its range gate passing (sometimes referred to as tracking), only the return from the nearest point on the ground to the radar, and within the area on the ground bounded by the Doppler swath within the bounds of the antenna beam. A location of the locus of tracked surface of received radar returns of the nearest, or generally highest, points on the ground within the crosstrack bounds of the antenna is generated in local coordinates by PTAN processor 140, including elevation, for correlation with DEM 154 in terrain correlation processor 156. Correlation processor 156 provides an aircraft location on DEM 154, which is utilized to update navigation processor 160 which also receives location information from inertial navigation unit 158. An output of navigation processor 160 is therefore a combined PTAN/inertial navigation position 162.

As described above, manmade structures built after the DEMs are generated, and any other errors in the maps, provide a hazard to low flying vehicles relying on these maps for navigation and obstacle avoidance. The combined navigation position 162 provides a reference on DEM 154, representing a present location of the vehicle, which is provided to forward map scanning processor 164. Forward map scanning processor 164 also receives return data received at forward looking antenna 144*a* velocity and heading from inertial navigation unit 158, map data from DEM 154, and altitude from PTAN processor 140. Forward map scanning processor 164 utilizes the inputs to determine a position on DEM 154 to scan that is forward of the vehicle. In one embodiment, forward map scanning processor 164 scans a horizontal field of view of DEM 154 that is approximately 40 degrees, for example, and forward of vehicle position in range a distance, for example, that is dependent on vehicle velocity. In one embodiment, and by way of example, the forward scan is positioned such that a pilot is provided about seven seconds warning time for an obstacle forward of the vehicle based on a current vehicle velocity.

Elements of the terrain ahead of the vehicle, including man made structures in terms of range, heading, and elevation, all in vehicle body coordinates, are provided by forward looking processor 146, are processed and reconciled with similar data from forward map scanning processor 164, by display processor 168 for display on display 170. In such a system, obstacles not recorded in DEM 154, but detected by the above described forward looking portion of radar altimeter 10 (shown in FIG. 2), can be safely avoided by the vehicle.

In one embodiment, forward looking radar antenna 144 (shown in FIG. 4) scans a field of view approximately ±20 degrees in azimuth by about ±10 degrees in elevation, with a narrow beam of about 2 degrees in width. The radar altimeter forward scans out a distance, dependent on vehicle velocity, as described above, providing range, heading, and elevation of obstacles all in body coordinates to display processor 168. Display processor 168 combines the DEM data from forward map scanning processor 164 and data from forward looking processor 146 to provide a user with a true picture of what is ahead of the vehicle.

The two sources of data (forward map scanning processor 164 and forward looking processor 146) also compliment one another. The forward looking function of radar altimeter 10 cannot see through obstacles (i.e. a building on the far side of a hill), as it is blinded by the hill. By contrast, forward map scanning processor 164 will know that the building is on the other side of the hill (assuming the map data includes the building). Structures built after map generation will not be seen by forward map scanning processor 164, whereas forward looking processor 146 will be able detect the structure based on the signals received at antenna 144. Combination of the data by display processor 168 results in radar data used to update map generated data before it is displayed. Obstacles detected by the forward looking function of radar altimeter 10, but not stored in DEM 154 are incorporated into the display data to be displayed on display 170 by display processor 168.

Radar altimeter 10 incorporating PTAN capabilities, forward looking radar antenna 144, along with DEM 154, provides a pilot with an awareness of such unmapped obstacles at the desired low altitudes and a capability to calculate paths around such obstacles. Further, addition of forward looking radar antenna 144, provides a safety factor resulting in an increased level of confidence, when pilots are required to fly along a low altitude flight path during poor visibility conditions.

The method for updating DEM generated data is also applicable to a radar altimeter with a forward looking antenna where a single antenna is switched between transmit and receive modes via a circulator to provide the altimeter (altitude) function, although such an altimeter is limited to specific operating conditions. A single radar antenna time sharing transmit and receive functions via a circulator or other transmit/receive switch can be used if the desired minimum radar range capability is somewhat greater than zero, and is directly dependent on a transmit pulse width. For example, a pulse width of 40 nanoseconds (which corresponds to the time it takes a radar transmission to travel about 20 feet) limits the altimeter range to about 20 feet (20 feet each for transmission and reflection) when a signal settling time is considered. However, where certain aircraft, for example helicopters, utilize altimeter functionality down to zero feet, separate transmit and receive antennas are utilized for the altitude function.

While the invention has been described in terms of various specific embodiments, those skilled in the art will recognize that the invention can be practiced with modification within the spirit and scope of the claims.

What is claimed is:

1. A method for detecting obstacles in the forward flight path of an air vehicle, the air vehicle utilizing a radar altimeter and an electronic digital elevation map for precision terrain aided navigation, the radar altimeter incorporating a forward looking antenna, said method comprising:

determining a position of the air vehicle on the digital elevation map;

selecting an area of the digital elevation map in the flight path of the air vehicle, based at least in part on the determined air vehicle position;

scanning the terrain representing the selected map area with the forward looking antenna;

combining the digital elevation map data for the selected area with radar return data for the scanned, selected area; and displaying the combined data to provide a representation of the terrain and obstacles in the forward flight path of the air vehicle.

2. A method according to claim 1 wherein said retrieving data and said scanning terrain are dependent on a vehicle speed.

3. A method according to claim 2 wherein the selected area of the digital elevation map and the scanned terrain are determined to provide a pilot with a sufficient warning time to avoid any obstacles scanned or present on the DEM.

4. A method according to claim 1 wherein scanning the terrain representing the selected map area with the forward looking antenna comprises scanning a field of view of about ±20 degrees in azimuth by about ±10 degrees in elevation.

5. A method according to claim 1 wherein scanning the terrain representing the selected map area with the forward looking antenna comprises scanning in a raster motion with a beam of about 2 degrees in width.

6. A method according to claim 1 wherein scanning the terrain representing the selected map area with the forward looking antenna comprises:
   scanning with the forward looking antenna in a raster motion; and
   performing radar altimeter functions during turnaround portions of the raster motion.

7. A method according to claim 1 wherein combining the digital elevation map data for the selected area with radar return data for the scanned, selected area comprises providing a range, a heading, and an elevation of obstacles forward of the vehicle in body coordinates.

8. A radar altimeter, comprising:
   a precision terrain aided navigation (PTAN) processor configured to process interferometric radar altimeter data;
   a terrain correlation processor configured to correlate data from said PTAN processor to a present vehicle location on a digital elevation map (DEM);
   a forward map scanning processor configured to receive an altitude from said PTAN processor and determine a position on the DEM to scan which is forward of the vehicle;
   a forward looking processor configured to receive data relating to a scan of the terrain corresponding to the position on the DEM that said forward map scanning processor is configured to scan; and
   a display processor configured to process and reconcile data from said forward map scanning processor and said forward looking processor.

9. A radar altimeter according to claim 8 further comprising a forward looking antenna, said forward looking antenna configured to scan in a raster motion and further configured to provide data relating to the scan to said forward looking processor.

10. A radar altimeter according to claim 9 wherein the raster motion is about ±20 degrees in azimuth and about ±10 degrees in elevation.

11. A radar altimeter according to claim 9 configured to receive interferometric radar altimeter data during turnaround portions of the raster motion.

12. A radar altimeter according to claim 8 wherein the position on the DEM that said forward map scanning processor is configured to scan is dependent on a velocity of the vehicle.

13. A method according to claim 12 wherein said forward map scanning processor and said forward looking processor are configured to respectively select an area of the digital elevation map and scan a section of terrain such that a pilot has a sufficient warning time to avoid any forward obstacles scanned or present on the DEM.

14. A radar altimeter according to claim 8 further comprising a navigation processor, said navigation processor configured to receive data from said terrain correlation processor relating to a present vehicle location on the DEM and location information from an inertial navigation unit (INU), and further configured to output a combined PTAN/INU navigation position.

15. A radar altimeter according to claim 8 wherein said forward map scanning processor is configured to receive velocity and heading from an inertial navigation unit.

16. A radar altimeter according to claim 8 wherein said forward looking processor is configured to provide a range, a heading, and an elevation of obstacles forward of the vehicle in body coordinates.

17. A processing unit for a radar altimeter, said processing unit configured to:
   receive and process interferometric radar altimeter data;
   correlate processed interferometric radar altimeter data to a present vehicle location on a digital elevation map (DEM);
   determine a terrain position to scan which is forward of the vehicle based at least in part on a position generated from the correlated interferometric radar altimeter data;
   receive data relating to a scan of the terrain corresponding to the correlated interferometric radar altimeter data; and
   combine the data relating to the scan of the terrain with data from the DEM.

18. A processing unit according to claim 17 wherein said unit is further configured to receive data relating to a raster motion scan of a forward looking antenna.

19. A processing unit according to claim 18 wherein said unit is further configured to receive the interferometric radar altimeter data during turnaround portions of the raster motion scan.

20. A processing unit according to claim 17 wherein said unit is configured to utilize a velocity of the vehicle when determining a position of the terrain to be scanned.

21. A processing unit according to claim 17 wherein said unit is further configured to utilize data relating to a present vehicle location on the DEM and location information from an inertial navigation unit (INU) to determine a combined precision terrain aided navigation (PTAN)/INU navigation position.

22. A processing unit according to claim 17 configured to receive velocity and heading from an inertial navigation unit.

23. A processing unit according to claim 17 configured to provide a range, a heading, and an elevation of obstacles forward of the vehicle in body coordinates.

* * * * *